United States Patent [19]

van der Walt

[11] Patent Number: 5,036,277
[45] Date of Patent: Jul. 30, 1991

[54] METHOD OF AND APPARATUS FOR DETECTING CROSS SECTIONAL AREA VARIATIONS IN AN ELONGATE OBJECT BY THE NON-INDUCTIVE MEASUREMENT OF RADIAL FLUX VARIATIONS

[75] Inventor: Nicolaas T. van der Walt, Johannesburg, South Africa

[73] Assignee: Crucible Societe Anonyme, Gerondins, Luxembourg

[21] Appl. No.: 273,269

[22] Filed: Nov. 18, 1988

[30] Foreign Application Priority Data

Nov. 23, 1987 [ZA] South Africa .................. 87/8754

[51] Int. Cl.$^5$ .................. G01N 27/82; G01N 27/72; G01R 33/12
[52] U.S. Cl. .................................. 324/235; 324/232; 324/240
[58] Field of Search .............. 324/229, 234, 235, 232, 324/239–243

[56] References Cited

U.S. PATENT DOCUMENTS

| 1,992,100 | 2/1935 | Stein . | |
|---|---|---|---|
| 2,049,924 | 8/1936 | Pugh | 324/224 |
| 2,065,119 | 12/1936 | Davis, Jr. . | |
| 2,124,579 | 7/1938 | Knerr et al. . | |
| 2,389,513 | 6/1959 | Callan et al. . | |
| 2,895,103 | 7/1959 | Vogt et al. . | |
| 3,242,425 | 3/1966 | Harmon . | |
| 3,273,055 | 9/1966 | Quittner . | |
| 3,424,976 | 1/1969 | Jezewski et al. . | |
| 3,694,740 | 9/1972 | Bergstrand . | |
| 3,881,151 | 4/1975 | Bigelow, Jr. . | |
| 3,887,865 | 6/1975 | Brooks . | |
| 4,002,967 | 1/1977 | Fennell . | |
| 4,096,437 | 6/1978 | Kitzinger et al. | 324/235 |
| 4,399,422 | 8/1983 | Nelson et al. . | |
| 4,427,940 | 1/1984 | Hirama et al. . | |
| 4,439,731 | 3/1984 | Harrison . | |
| 4,495,465 | 1/1985 | Tomaiuolo et al. . | |

FOREIGN PATENT DOCUMENTS

| 0239537 | 9/1987 | European Pat. Off. ............ 324/232 |
|---|---|---|
| 2350600 | 4/1977 | France . |
| 936033 | 1/1961 | United Kingdom . |
| 1270748 | 9/1970 | United Kingdom . |
| 1542933 | 5/1976 | United Kingdom . |
| 2012956 | 12/1978 | United Kingdom . |
| 2100440 | 6/1981 | United Kingdom . |
| 2115558 | 7/1981 | United Kingdom . |
| 2071331 | 9/1981 | United Kingdom . |
| 0127443 | 5/1984 | United Kingdom . |
| 2206969 | 6/1988 | United Kingdom . |

OTHER PUBLICATIONS

Herbert R. Weischedel, The Inspection of Wire Ropes in Service: A Critical Review, Reprinted from Materials Evaluation, vol. 43, No. 13, pp. 1592–1605, 1985, American Society for Nondestructive Testing, Inc.

Primary Examiner—Walter E. Snow
Attorney, Agent, or Firm—Barnes & Thornburg

[57] ABSTRACT

A method and apparatus is provided for electromagnetically testing an elongate object such as a wire rope for cross-sectional area variations. The elongate object is magnetized over adjacent sections in opposing directions along a longitudinal axis of the elongate object. Variations in axial magnetic flux, which have been observed to be coincident with variations in the cross-sectional area of an elongate object, are measured by a plurality of non-inductive transducers. The transducers are interconnected to produce a composite signal. The composite signal is compared to a reference signal.

11 Claims, 4 Drawing Sheets

METHOD OF AND APPARATUS FOR DETECTING CROSS SECTIONAL AREA VARIATIONS IN AN ELONGATE OBJECT BY THE NON-INDUCTIVE MEASUREMENT OF RADIAL FLUX VARIATIONS

BACKGROUND OF THE INVENTION

This invention relates generally to the electromagnetic testing of elongate objects such as cables, pipes, rods and the like and is concerned in particular with the detection of cross sectional area variations in a wire rope.

Steel hoist ropes are used in many applications for conveying personnel or material. Such ropes must be examined regularly to ensure that operational standards are consistently being maintained and to detect deterioration in the ropes before safety problems can arise.

Defects in a wire rope can be placed in one of three categories, namely cross sectional area variations, changes in the wire contact pattern of a rope which is made up from strands of wires wound in a particular pattern, and broken wires.

The invention is concerned primarily with the first mentioned characteristic namely cross sectional area variations in a rope. The strength of a wire rope is dependent on its cross sectional steel area and this can for example be reduced by normal wear and tear, corrosion, and stretch necking of a weak part.

SUMMARY OF THE INVENTION

The invention provides a method of detecting cross sectional area variations in an elongate object which includes the steps of axially magnetizing the object and of using at least one non-inductive transducer to detect variations in the axial magnetic flux in the object which are attributable to cross sectional area variations.

The axial magnetic flux variations may be detected by measuring variations in the radial magnetic flux emanating from, or passing to, the object.

It will be shown, hereinafter, that radial magnetic flux density is proportional to axial magnetic flux density gradient.

The invention also extends to apparatus for detecting cross sectional area variations in an elongate object which includes a magnetizing head for establishing a first magnetic field and at least a second magnetic field which is adjacent the first magnetic field, the two magnetic fields being directed respectively in opposing senses, a pathway being formed for the object which permits the object to travel in an axial direction through the first magnetic field and through the second magnetic field whereby the object is magnetized in opposing axial directions by the first and second magnetic fields respectively, and at least one non-inductive transducer for detecting variations in radial flux from or to the object which are attributable to cross sectional area variations in the object.

The magnetizing head may be used to magnetize that portion of the object which is on the pathway axially in opposing directions.

Use may be made of a plurality of the transducers and output signals produced by the transducers may be processed in any suitable way, for example by being summed, thereby to produce a composite signal. The composite signal may be compared to a reference signal.

Each transducer may comprise a Hall-multiplier, a magneto-resistor, or a similar device.

In the event that a plurality of the tranducers are used these may be arranged so that they extend at least in the axial direction of the object. The transducers may also extend circumferentially around the object.

The transducer or transducers may be located within the magnetizing head, for example adjacent a former which is aligned with the object pathway and which extends through the magnetizing head.

The transducers may extend at least axially within the head between first and second positions at which the magnetic field in the object is at a maximum, in opposed senses, respectively. Alternatively the transducers may extend at least axially from within the head at a first position at which the magnetic field in the object is at a maximum, to a second position outside the head at which the magnetic field in the object is zero.

The magnetizing head may include an inner pole of a first polarity, two outer poles of a second polarity which is opposite to the first polarity, and permanent magnetic stacks between the inner pole and each outer pole, respectively.

In one example of the invention a plurality of transducers are connected in a bridge configuration so as to compensate for temperature effects.

BRIEF DESCRIPTION OF THE DRAWINGS

The invention is further described by way of example with reference to the accompanying drawings in which.

DESCRIPTION OF PREFERRED EMBODIMENT

The principles of the invention are described hereinafter firstly by examining the theoretical basis of the invention and thereafter by considering one example of a practical implementation of the theoretical principles.

THEORETICAL CONSIDERATIONS

Figure 1:
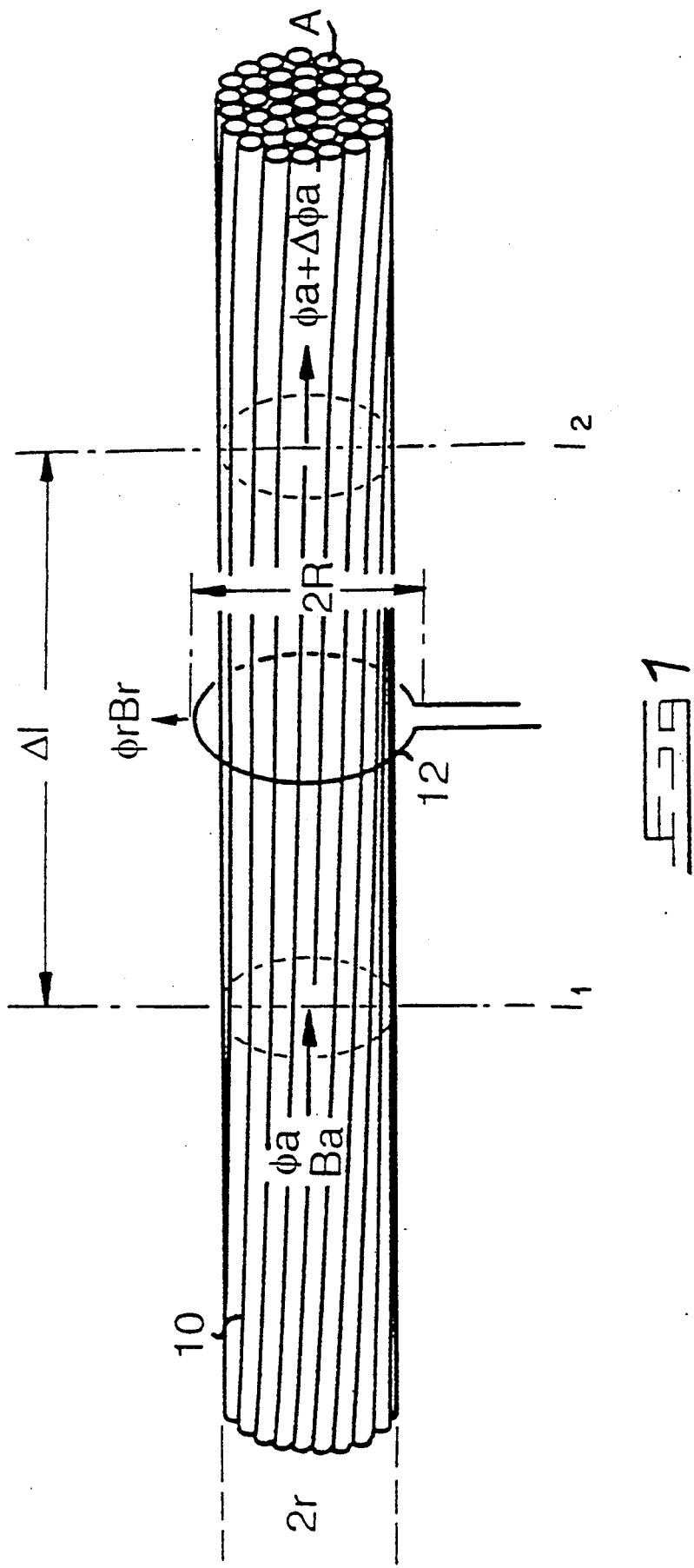
FIG. 1 illustrates portion of a steel cylinder, which for example consists of a length of wire rope, which is magnetized.

FIG. 1 illustrates a portion of a steel cylinder 10 which in this example is a length of wire rope of radius r and of cross sectional area A. A coil 12 of radius R is positioned around an element of the wire of length $\Delta l$.

Assume that the wire rope is magnetized axially and that the axial magnetic flux density is $B_a$. The axial flux at the left hand side of the element is $\phi_a$ while at the right hand side of the element the flex is $\phi_a + \Delta\phi_a$.

Over the length $\Delta l$ of the element the radial flux density is $B_r$ and the radial flux is $\phi_r$.

The relationship between the axial flux and the axial flux density can be expressed as follows:

$$\phi_a = B_a A \tag{1}$$

The total axial flux which is included by the coil 12 is $\phi_t$ and is given by the expression:

$$\phi_t = \phi_a + \phi_s \qquad (2)$$

where $\phi_s$ is the intrinsic flux in the total area of the coil. Equation (2) can be rewritten as:

$$\phi_t = B_a A + B_s \pi R^2 \qquad (3)$$

where $B_s$ is the flux density in space and is given by the expression:

$$B_s = \frac{\mu_o}{\mu} B_a \qquad (4)$$

$\mu_o$ is the intrinsic permeability of free space and $\mu$ is the intrinsic permeability of the wire rope element at the flux density $B_a$.

By combining equation (3) with equation (4), equation (3) can be rewritten:

$$\phi_t = B_a A + \frac{\mu_o}{\mu} B_a \pi R^2 \qquad (5)$$

If equation (5) is differentiated with respect to A, in order to determine the relationship between the total flux through the coil 12 and a variation in the cross sectional area of the rope 10, one arrives at the following equation:

$$\frac{d\phi_t}{dA} = B_a \qquad (6)$$

Equation (6) means that if there is a variation in the cross sectional area of the wire rope element under consideration equal to $\Delta A$, there is a resulting variation of the axial flux in the element $\Delta \phi_a$, which is the same as the variation in the flux through the coil 12, which is $\Delta \phi_t$ and which is given by the expression:

$$\Delta \phi_t = B_a \Delta A \qquad (7)$$

From equation (7) one can deduce that for a wire rope element which is axially magnetized, and at any flux density, variations in the cross sectional area of the wire rope element can be measured by measuring variations in the total axial magnetic flux in the wire element.

FIG. 1 depicts a situation wherein the axial flux in the wire rope element 10 varies by an amount $\Delta \phi_a$ over the length $\Delta l$. The flux law of Gauss states that lines of flux are continuous and have no origin. Consequently a variation of axial flux, as shown in FIG. 1, must be accompanied by a variation of the radial flux $\phi_r$ over the length $\Delta l$.

Assume that $\Delta l$ is small enough for the radial flux density $B_r$ at the radius R of the coil 12 to be considered constant. One may then express the resulting relationship as:

$$\Delta \phi_a = A_c B_r \qquad (8)$$

where $A_c$ is the area of the wall of a cylinder of radius R and of length $\Delta l$ and is given by the expression:

$$A_c = 2\pi R \Delta l \qquad (9)$$

Through the use of equation (9), equation (8) can be rewritten as:

$$\Delta \phi_a = (A_c B_r) = 2\pi R \Delta l B_r \qquad (10)$$

If the area over which the flux difference $\Delta \phi_a$ takes place is constant then $\Delta \phi_a = \Delta(B_a A) = \Delta B_a A$. Equation (10) can then be rewritten as:

$$B_r = \frac{\Delta B_a A}{\Delta l 2\pi R} \qquad (11)$$

If $\Delta l \to 0$ then equation (11) can be expressed in the following form:

$$\frac{dB_a}{dl} = \frac{2\pi R}{A} B_r(l) \qquad (12)$$

Equation (12) gives the relationship between the axial flux density and the radial flux density as a function of the length l of the wire rope element 10.

Integration of equation (12) over a length of the wire rope element between locations $l_1$ and $l_2$ gives the following relationship:

$$B_a(l_2) - B_a(l_1) = \frac{2\pi R}{A} \int_{l_1}^{l_2} B_r(l) dl \qquad (13)$$

which can be expressed as:

$$\phi_a(l_2) - \phi_a(l_1) = \Delta \phi_a = \Delta \phi_t = \frac{2\pi R}{1} \int_{l_1}^{l_2} B_r(l) dl \qquad (14)$$

The interpretation to be placed on equation (14) is that a variation in the axial flux between any two points along the length of a magnetized cylinder is equal to the change in the radial flux which penetrates the cylinder between these two points. This relationship is true not only for a radial surface which has a constant radius R but for any surface, whatever its circumferential shape, provided that $B_r$ is defined as being normal to the circumferential surface along its entire circumferential length.

Equation (7) shows that the change in the flux through the coil 12 is dependent upon any area variation of the wire rope element 10 and equation (14) shows that the flux change can be measured by a process involving integration of the radial flux density. These two equations can be combined to give the following relationship:

$$\Delta A = \frac{2\pi R}{B_a} \int_{l_1}^{l_2} B_r(l) dl \qquad (15)$$

AN EXAMPLE OF THE INVENTION BASED ON THE AFOREMENTIONED THEORETICAL CONSIDERATIONS

Figure 2:
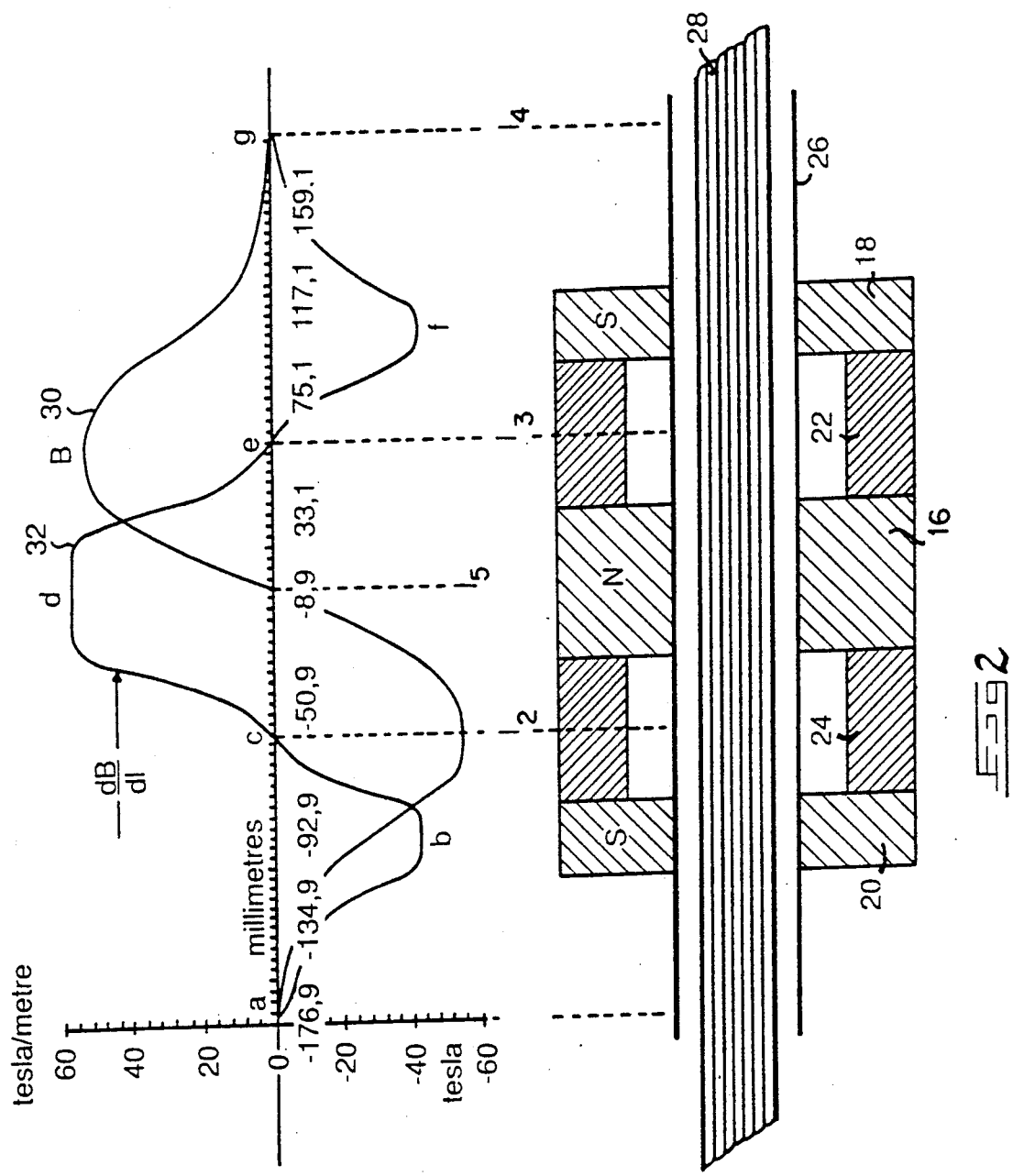
FIG. 2 illustrates in cross section and from the side a magnetizing head which is used for magnetizing a wire rope and, adjacent the magnetizing head, graphs depicting the variation of magnetic flux density, and of the rate of change of magnetic flux density, relatively to the length of the magnetizing head.

FIG. 2 illustrates from the side and in cross section a magnetising head 14 of the kind disclosed in South African Patent No. 87/1964. This head includes a central north pole 16 and two outer south poles 18 and 20 respectively. Permanent magnet stacks 22 and 24 are positioned on formers respectively between the opposing faces of the pole pairs.

Transducers 29 are located adjacent the former extending in the axial direction of the rope.

The magnet stacks and the pole pieces are circumferentially positioned on a former 26 which provides an axial path through the magnetizing head for a rope 28 which is to be tested. Above the drawing of the magnetizing head 14 is a graph 30 which illustrates the variation of the flux density B in the wire rope 28, and a graph 32 which depicts the variation of the flux density gradient in the rope, both as a function of the axial position within the head. At locations $l_1$, $l_2$, $l_3$ and $l_4$, the curve 32 has zero values. The curve 30 has zero value at a location $6_5$ which corresponds approximately to the central position of the north pole, and at the locations $l_1$ and $l_4$. Maximum flux density values occur, in the negative sense, at $l_2$ and, in the positive sense, at $l_3$.

Various critical points on the curves 30 and 32 are marked with the reference letters a to g.

Using equation (14) and integrating, in each case, between the locations $l_1$ and $l_2$, $l_2$ and $l_3$, and $l_3$ and $l_4$, gives the following expressions:

$$-B_m A = -2\pi R \int_{l_1}^{l_2} B_r(l) dl \qquad (16)$$
$$= -2\pi R \text{ (area under curve } abc)$$

$$-B_m A - B_m A = -2\pi R \int_{l_2}^{l_3} B_r(l) dl \qquad (17)$$
$$= -2\pi R \text{ (area under curve } cde)$$

$$B_m A = 2\pi R \int_{l_3}^{l_4} B_r(l) dl \qquad (18)$$
$$= 2\pi R \text{ (area under curve } efg)$$

Equation (18), for example, is an expression of the net radial flux which enters the circumferential surface of the rope between the locations $l_3$ and $l_4$.

Consider non-inductive flux measuring devices such as Hall multipliers, magneto resistors and the like. Assume that a device of this kind has an active area S which, if the device is rectangular, is given by the expression S=lw where l is the length of the active area and w is the width of the active area.

If the device is sufficiently small its sensitivity is constant and its output signal f is directly proportional to the flux over the active area.

f may be expressed as:

$$f = K\phi_m = KB_m lw \qquad (20)$$

where $\phi_m$ is the flux over the active surface area S, and $B_m$ is the average flux density, S being small enough for $B_m$ to be regarded as being constant over the area S. K is a constant associated with the device.

If a transducer element such as the kind under discussion is placed at any point in the test head of FIG. 2 between the locations $l_3$ and $l_4$ for example, at a radial distance r from the longitudinal axis of the rope, with the active area S of the element being normal to a radius extending from the axis then, from equation (20), $$f(l) = KB_r(l) lw \qquad (21)$$

where $B_r(l)$ is the radial flux density as a function of axial rope length.

If a string of similar transducer elements is placed with the active area of each element adjacent that of its neighbours, over the length from $l_3$ to $l_4$, and if these elements are connected so that their respective output signals are accumulated then the net signal F output by the transducers is given by:

$$F = \sum_{l_3}^{l_4} f(l) = Kw \sum_{l_3}^{l_4} B_r(l) l \qquad (22)$$

and if $l \to 0$ then $$F = Kw \int_{l_3}^{l_4} B_r(l) dl \qquad (23)$$

By using equation (18), for r=R, equation (23) can be rewritten:

$$F = \frac{Kw}{2\pi R} B_m A \qquad (24)$$

Since K, w, R, and $B_m$ are constant it follows that the output signal F of a string of interconnected transducers, extending from $l_3$ to $l_4$ is directly proportional to the cross sectional area A of the rope.

Variations $\Delta A$ in the cross sectional area of the rope can be expressed by the formula:

$$\Delta A = \left(\frac{2\pi R}{KwB_m}\right) \Delta F \qquad (25)$$

Similar expressions may be arrived at for transducer strings extending between the locations $l_1$ and $l_2$, and $l_2$ and $l_3$, respectively, using the equations (16) and (17) in each case.

The relationship given in equation (25) is independent of the velocity of the rope. A limiting velocity is however determined by the speed of response of the transducer elements to flux changes. If the transducer elements have ideal characteristics then variations in cross sectional area of a wire rope may be measured directly at zero rope velocity. It is apparent that the transducer elements, connected in strings, may be incorporated in the test head as shown in FIG. 2, and designated by the number 29, extending between the locations $l_1$ and $l_2$, or $l_2$ and $l_3$, or $l_3$ and $l_4$. Two of the transducer strings may also be used or, if desired, all three possible transducer arrangements may be used.

It is known that a conventional wire rope of the kind used in hoists for underground mining saturates magnetically at approximately 1,7 tesla. A test head shown in FIG. 2 is designed so that the rope passing through it is magnetized at approximately 2,2 tesla which is substantially into saturation.

As the rope passes through the test head all parts of it are first magnetized into negative saturation at $l_2$ and subsequently into positive saturation at $l_3$. Irrespective of the remnant magnetism in the rope before it enters the test head that part of the curve 30 between $l_2$ and $l_3$ is repeatable whenever a particular rope is passed through a particular test head.

It is therefore preferred if the transducer string which is employed in the apparatus of the invention extends between the locations $l_2$ and $l_3$.

By combining equation (17) with equation (23), for the embodiment in which the transducer strings extend between $l_2$ and $l_3$, cross sectional area variations $\Delta A$ are given by the equation:

$$\Delta A = \frac{\pi R \Delta F}{K_w B_m} \quad (26)$$

From the practical point of view it is necessary only to monitor the net voltage which is generated by the transducer string and to detect variations in this voltage in order to locate irregularities in the cross sectional area of the rope under test.

To enhance the sensitivity of the test method, additional transducer strings may be used so that an array of transducer strings is produced which extends substantially over the entire circumferential surface of radius R between $l_2$ and $l_3$. In this case substantially all of the radial flux between $l_2$ and $l_3$ is measured. Obviously if it were possible to make such a device the same result would be achieved with a single transducer with a constant sensitivity over its entire active area which extends around the rope and which has an active length of $(l_3 - l_2)$ and an active width $(2\pi R)$.

Figure 3:
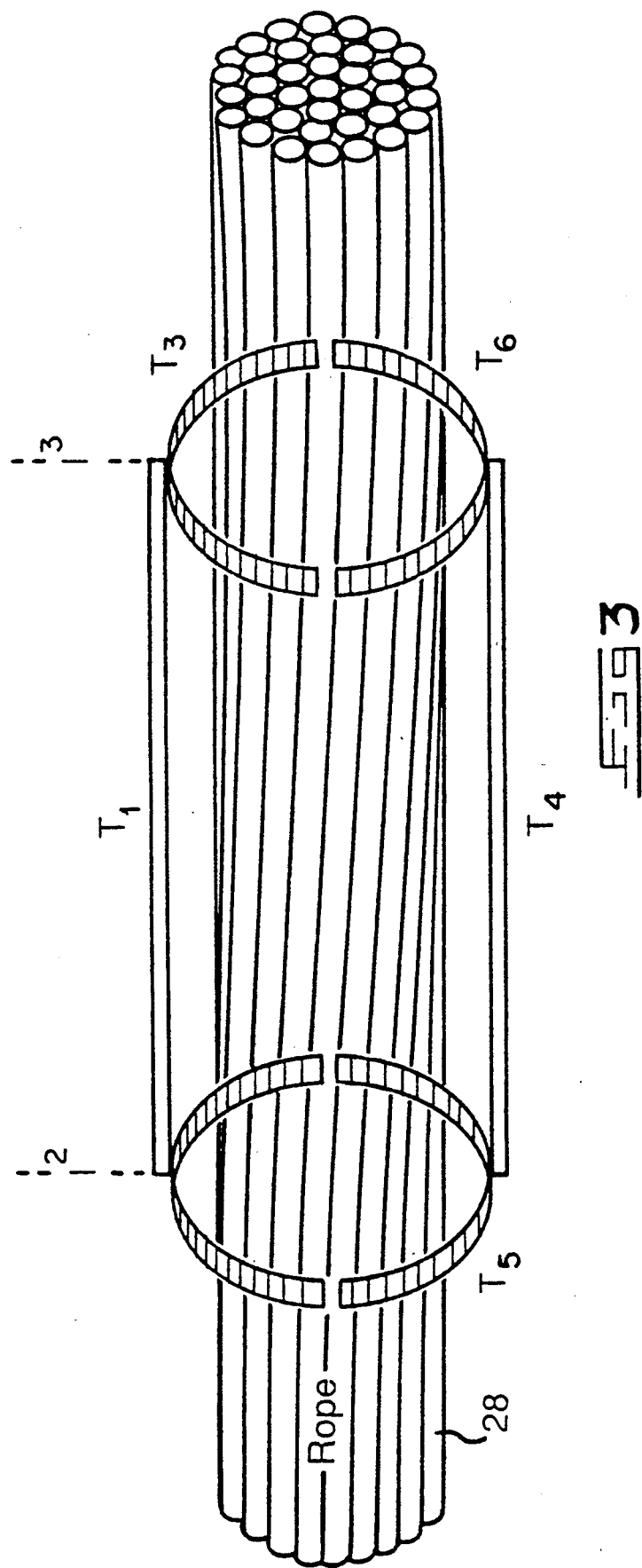
FIG. 3 illustrates, somewhat schematically, an arrangement of transducers in accordance with an embodiment of the invention.

FIG. 3 illustrates the rope 28 under test with six transducer strings $T_1$ to $T_6$ respectively positioned around the rope. The test head itself has not been shown in order to enhance the clarity of the illustration.

In the illustrated embodiment the transducer strings $T_1$ and $T_4$ are diametrically opposed and extend in grooves in the former 26 in a longitudinal direction between the locations $l_2$ and $l_3$. Identical transducer strings $T_2$ and $T_5$ extend semi-circumferentially at the locations $l_2$ and $l_3$ respectively while opposing transducer strings at $T_5$ and $T_6$ extend semi-circumferentially at the same locations.

Assume that the transducer strings are made up from magneto resistors. These devices have temperature coefficients which may affect area measurements. At the locations $l_2$ and $l_3$ $B_r = 0$. Consequently the semi-circumferential transducer strings $T_2$ and $T_3$ and $T_5$ and $T_6$ are magnetically inactive.

Figure 4:
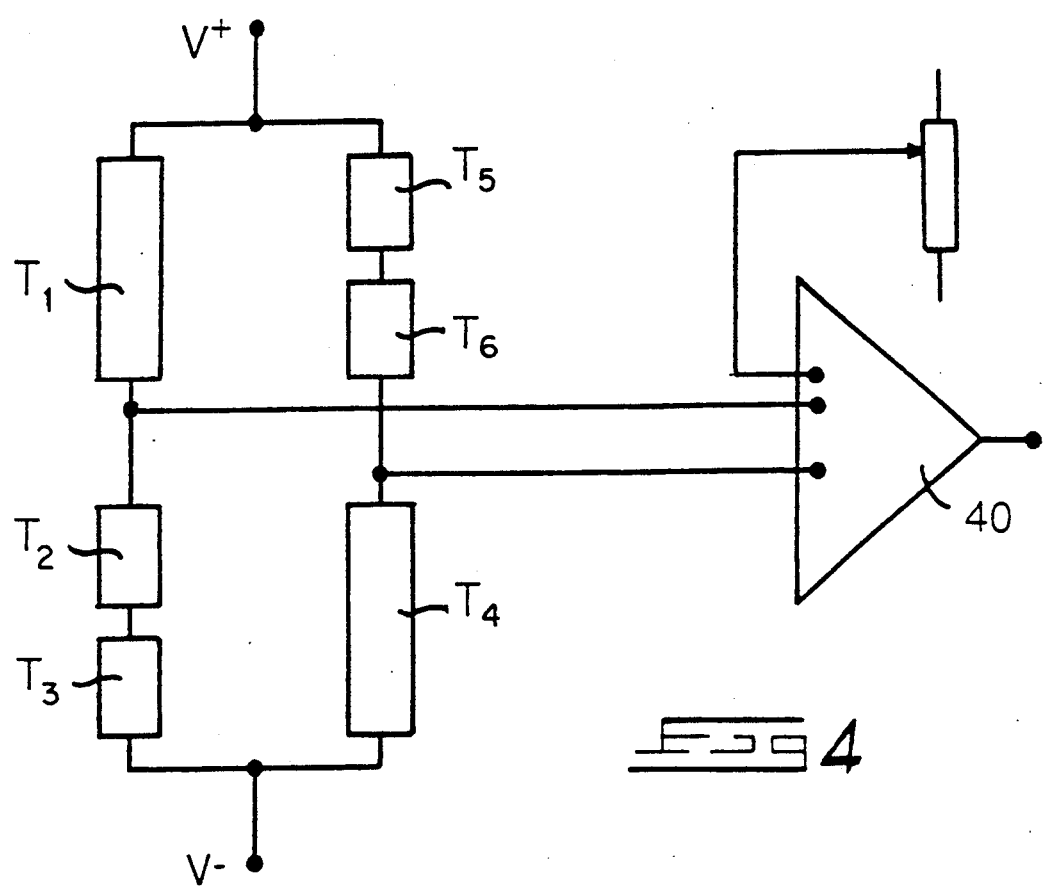
FIG. 4 shows a measuring arrangement used with the apparatus of the invention.

Assume that the six transducer strings of FIG. 3 are connected in a Wheatstone bridge as shown in FIG. 4. The inactive strings $T_2$ and $T_3$, and $T_5$ and $T_6$, compensate for temperature effects in the active strings $T_1$ and $T_4$ provided of course that the elements are matched and that at zero flux density the resistance values within the bridge balance out.

With the FIG. 4 arrangement the output of an amplifier 40 which monitors variations in the output signal of the bridge arrangement is proportional to variations in cross sectional area of the rope 28 under test.

Similar arrangements may be used for example with Hall effect devices, or other non-inductive transducers.

The invention finds a primary application in the testing of wire ropes, and this application has been described hereinbefore. The scope of the invention is not restricted though to this particular use for the invention may be used to test other elongate objects such as pipes, cables, rods and the like.

I claim:

1. Apparatus for detecting cross-sectional area variations in an elongate object comprising:

a magnetizing head for establishing a first magnetic field and a second magnetic field which is adjacent the first magnetic field, the first and second magnetic fields being directed respectively in opposing senses, means for forming a pathway for the object which permits the object to travel in an axial direction through the first magnetic field and through the second magnetic field so that the object is magnetized in opposing axial directions by the first and second magnetic fields, respectively, a plurality of non-inductive transducers for detecting variations in radial flux from or to the object, two of the transducers positioned on diametrically opposed sides of the elongate object being arranged so that they extend along a longitudinal axis of the object and being interconnected to produce a composite signal, and means for comparing the composite signal to a reference signal, the transducers extending axially from within the magnetizing head at a first position at which the first magnetic field is at a maximum, to a second position outside the magnetizing head at which the net magnetic field from the sum of the first and second magnetic fields is zero.

2. Apparatus according to claim 1 wherein said two of the transducers extend axially between first and second positions at which the first and second magnetic fields are at a maximum, in opposed senses, respectively.

3. Apparatus according to claim 1 wherein some of the plurality of the transducers are connected in a bridge configuration so as to compensate for temperature effects.

4. Apparatus according to claim 3 wherein the bridge configuration includes two axially directed arrays of transducers which are positioned respectively on diametrically opposed sides of the elongate object, and four semi-circumferential arrays of transducers arranged in a first opposing pair adjacent first ends of the axial arrays respectively, and in a second opposing pair adjacent second ends of the axial arrays respectively.

5. Apparatus according to claim 1 wherein each transducer is a Hall effect device.

6. Apparatus according to claim 1 wherein the magnetizing head includes an inner pole of a first polarity, two outer poles of a second polarity which is opposite to the first polarity, and permanent magnetic stacks between the inner pole and each outer pole, respectively.

7. Apparatus according to claim 1 wherein the means for forming a pathway for the object includes a former which extends through the magnetizing head, each transducer being mounted to the former.

8. Apparatus according to claim 1 wherein each transducer is a magneto-resistor.

9. Apparatus for detecting cross-sectional area variations in an elongate object comprising:

a magnetizing head for establishing a first magnetic field and at least a second magnetic field which is adjacent the first magnetic field, means for forming a pathway for the elongate object which permits the elongate object to travel in an axial direction through the first magnetic field and through the second magnetic field so that the object is magnetized in opposing axial directions by the first and second magnetic fields respectively, a plurality of non-inductive transducers for detecting variations in radial flux from or to the object, the transducers being interconnected in a bridge configuration including two axially directed arrays of transducers positioned respectively on diametrically opposed sides of the object, four semi-circumferential arrays of transducers arranged in a first opposing pair adjacent first ends of the axial arrays respectively, and in a second opposing pair adjacent second ends of the axial arrays respectively, the transducers producing a composite signal, and means for comparing the composite signal to a reference signal.

10. Apparatus for detecting cross-sectional area variations in an elongate object comprising:

a magnetizing head for establishing a first magnetic field and at least a second magnetic field which is adjacent the first magnetic field, means for forming a pathway for the object which permits the object to travel in an axial direction through the first magnetic field and through the second magnetic field whereby the object is magnetized in opposing axial directions by the first and second magnetic fields respectively, a plurality of non-inductive transducers for detecting variations in radial flux from or to the object, the transducers being interconnected in a bridge configuration including two axially directed arrays of transducers positioned respectively on diametrically opposed sides of the object, four semi-circumferential arrays of transducers arranged in a first opposing pair adjacent first ends of the axial arrays respectively, and in a second opposing pair adjacent second ends of the axial arrays respectively, the transducers extending axially from within the magnetizing head at a first position at which the magnetic flux in the object is at a maximum value, to a second position outside the magnetizing head at which the magnetic flux in the object is zero, the transducers being interconnected to produce a composite signal, and means for comparing the composite signal to a reference signal.

11. A method for detecting cross-sectional area variations in an elongate object comprising the steps of:

positioning a magnetizing head so as to form a pathway for receipt of the elongate object introducing the elongate object into the magnetizing head by way of the pathway magnetizing the elongate object with the magnetizing head over two adjacent sections in opposing directions along a longitudinal axis of the elongate object extending two arrays of interconnected non-inductive transducers along a longitudinal axis of the elongate object on diametrically opposed sides of the elongate object, the axial arrays having first ends and second ends positioning a first opposing semi-circumferential pair of interconnected non-inductive transducing arrays adjacent the first ends of the axial arrays, and positioning a second opposing semi-circumferential pair of interconnected non-inductive transducer arrays adjacent the second ends of the axial arrays, connecting the axial arrays and both pairs of semi-circumferential arrays in a bridge configuration, and monitoring a composite signal produced by the transducers to detect variations in a radial magnetic flux associated with the elongate object.

* * * * *